J. W. BILLINGS.
DESCRIPTIVE FILM ATTACHMENT AND SYNCHRONIZING MECHANISM.
APPLICATION FILED OCT. 2, 1915.
1,205,427.
Patented Nov. 21, 1916.
2 SHEETS—SHEET 1.
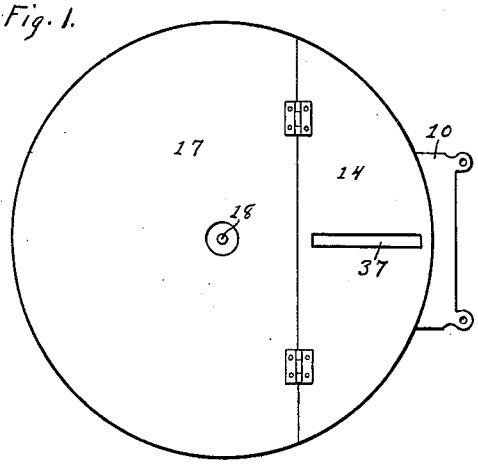
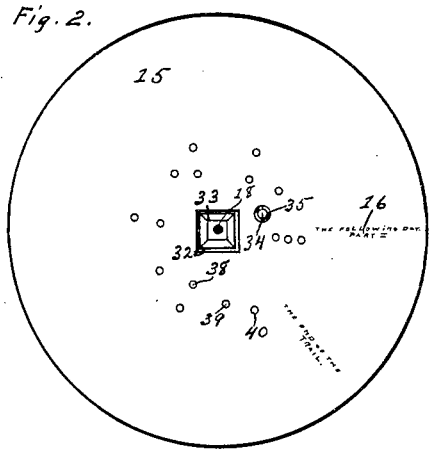
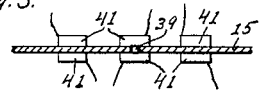
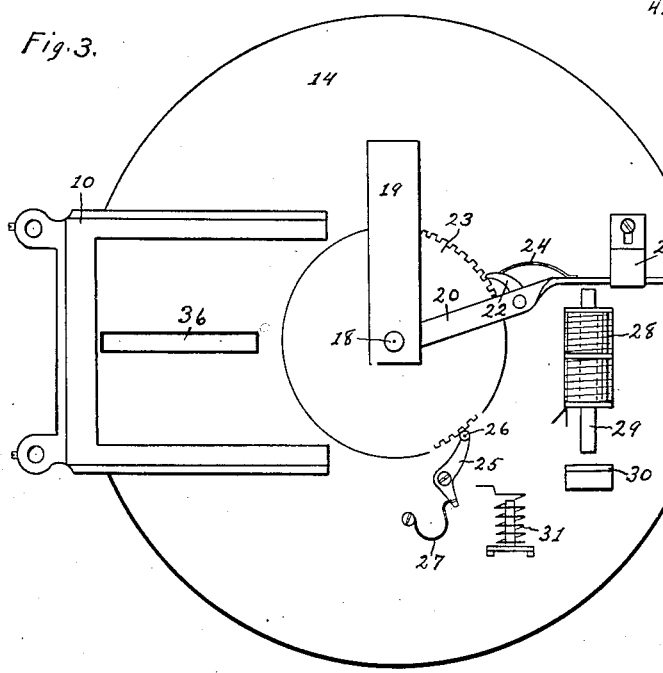
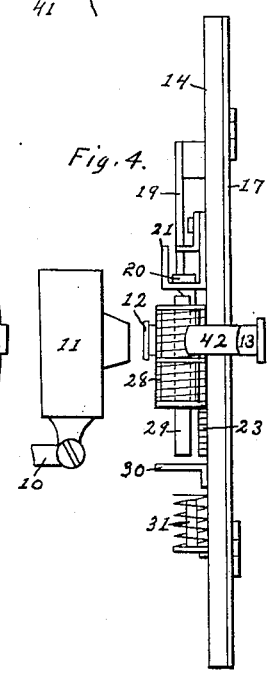

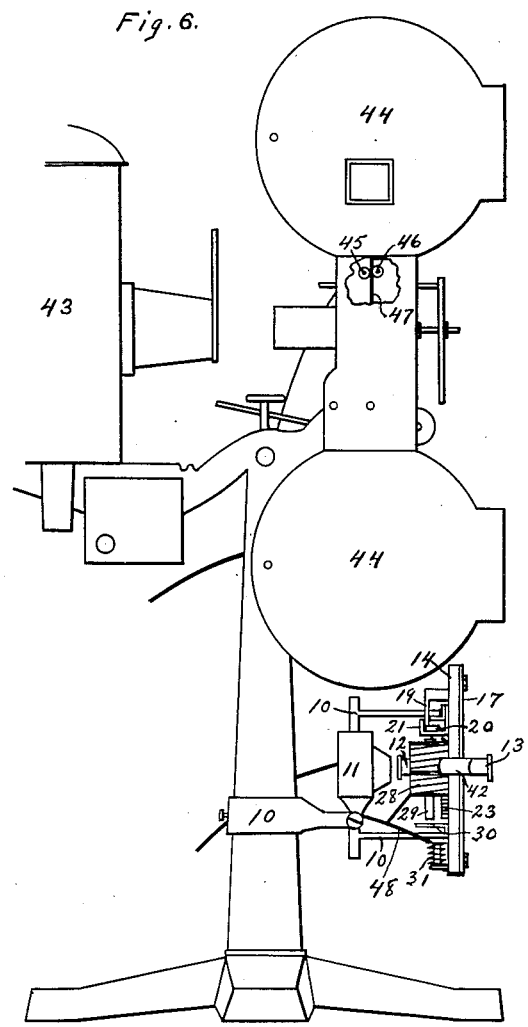

UNITED STATES PATENT OFFICE.

JOHN W. BILLINGS, OF UNION, IOWA.

DESCRIPTIVE-FILM ATTACHMENT AND SYNCHRONIZING MECHANISM.

1,205,427.  Specification of Letters Patent.  Patented Nov. 21, 1916.

Application filed October 2, 1915. Serial No. 53,705.

*To all whom it may concern:*

Be it known that I, JOHN W. BILLINGS, citizen of the United States of America, and resident of Union, Hardin county, Iowa, have invented a new and useful Descriptive-Film Attachment and Synchronizing Mechanism, of which the following is a specification.

The object of this invention is to provide an improved attachment for moving picture projecting machines whereby successive items of descriptive or other matter relating to the pictures being shown may be thrown on the screen independently of the main film and apparatus and yet synchronized thereto, and without interfering with the continuous operation of the main film.

A further object of this invention is to provide improved mechanism operated by the travel of the main film for advancing the descriptive film.

A further object of this invention is to provide an improved form of descriptive film, and an improved housing for containing the same.

A further object of this invention is to provide means connected with the descriptive film for synchronously operating other related devices.

My invention consists in the construction, arrangement and combination of elements hereinafter set forth, pointed out in my claims and illustrated by the accompanying drawing, in which—

Figure 1 is a front view of the descriptive film housing. Fig. 2 is a face view of the descriptive film. Fig. 3 is a rear view of the film housing and portions of the synchronizing mechanism, on an enlarged scale. Fig. 4 is a side elevation of the same. Fig. 5 is a sectional detail of certain controlling devices. Fig. 6 is a side elevation illustrating the attachment in position on a moving picture projecting machine. Fig. 7 is a detail section illustrating the means for securing the word disk on its shaft. Fig. 8 is a face view of the main or picture film, showing the contact devices. Fig. 9 is a vertical or cross-section, on an enlarged scale, showing the contact rollers through which the main film travels, and Fig. 10 is a plan of the same. Fig. 11 is a diagram illustrating the electrical connections between the contact devices connected with the main film, and the means for actuating the descriptive film. Fig. 12 is a similar diagram showing the connections between the contact devices connected with the descriptive film, and a supplementary device.

This invention relates to and is an improvement on the devices illustrated, described and claimed in my companion applications filed, respectively, April 24, 1915, Serial Number 23,591, and August 9, 1915, Serial Number 44,421, to which applications reference hereby is made.

In the construction of the improvement as shown the numeral 10 designates a frame attached to a moving picture projector, which may be of any desired construction only a small portion of which is here shown, including a main lamp 43 and main film housing 44. A projecting lamp 11 is mounted on and carried by the frame 10, and also a condensing lens 12 and a projecting lens 13, for the projection of the printed matter of the film about to be described. A circular housing 14 is carried by the frame 10 between the condensing lens 12 and projecting lens 13, and is adapted to contain the descriptive film 15. The descriptive film 15 is of circular form, and is divided into a plurality of segments, each bearing an item 16 of printed matter, preferably comprising about two lines, such matter referring or relating to the picture to be shown in conjunction therewith. The housing 14 is provided with a hinged door 17 in its front, by which the film 15 may be removed and replaced. A shaft 18 is mounted horizontally through the center of the housing 14, projects beyond the rear wall thereof, and is journaled for rotation in the walls of the housing and in a bracket 19 on the rear wall. A lever 20 is pivoted at one end on the shaft 18 and extends transversely across the rear wall of the housing 14 and has its free end confined within and limited as to vertical movement in both directions by a keeper 21 fixed to the housing, and said keeper preferably is adjustable vertically thereon. A pawl 22 is pivoted on the lever 20 and is adapted to engage and impart step-by-step rotary movement to a ratchet wheel 23 mounted on and fixed to the shaft 18. A leaf spring 24 preferably is fixed to the lever 20 and engages the pawl 22 to hold said pawl in engaging position.

A detent is provided to steady and rightly position the ratchet wheel 23, and comprises a bell-crank lever 25 pivoted to the rear wall of the housing and carrying at one end a roller 26 adapted to engage between successive teeth of said ratchet wheel. A spring 27 is fixed at one end to the housing and at its opposite end to the lever 25, and tends to yieldingly hold the roller 26 in engaging position relative to the ratchet wheel.

A solenoid coil 28, formed with a hollow core, is mounted on the rear wall of the housing 14, and is provided with an armature 29 vertically movable through the hollow core and adapted to be attracted and moved upwardly whenever the coil 28 is energized by the passage of an electric current therethrough. The armature 29 is so arranged that in its upward movement its upper end engages beneath and lifts the free end of the lever 20, thus causing the pawl 22 to engage the ratchet wheel 23 and move it one step, together with the shaft 18 to which said wheel is fixed. As soon as the coil 28 loses its energy the armature 29 is permitted to drop by gravity, thus permitting the lever 20 also to drop at its outer end, in readiness for another impulse. The downward movement of the armature 29 is limited by a stop 30 fixed to the rear wall of the housing, and the downward movement of the lever 20 is limited by the keeper 21.

The means for completing the circuit to intermittently energize the coil 28, and to control the same by and synchronize it with the picture film, is fully described in my companion application Number 44,421 above referred to, and is also shown in the drawings herewith. In this construction rollers 45, 46, having metallic peripheries, are mounted for rotation in contact with each other between the main housings 44, 44, and in such position that the main or picture film, 47, passes between them in its travel. The peripheries of the rollers 45, 46 are connected to the respective conductors 48 which form the circuit with the coil 28, and when said rollers are in contact the circuit is completed therethrough. However, when the film 47 is in position between the rollers 45, 46 they are insulated thereby from each other, so that the coil 28 is normally in broken circuit. Contact buttons 49 are mounted at selected intervals through the main or picture film 47, and are adapted, when passing between the rollers 45, 46, to complete the circuit, energize the magnet or coil 28, actuate the armature 29, and step forward the descriptive film 15 as above described. Thus successive items on the descriptive film are brought into position for projection, according to the arrangement of the contact members 49 on the main picture film. An intensifier, such as 31, preferably is included in the circuit to the coil 28, so that the device may be operated by a single dry cell or battery.

The circular film 15 is formed with an angular aperture 32 at its center, adapted for yielding engagement with an angular mandrel 33 formed on and fixed to the shaft 18 within the housing 14, whereby the film may be removably secured to and arranged for rotation with the said shaft. A stud 34 projects laterally from the mandrel 33 and turns outwardly, and is adapted to pass through an off-center aperture 35 in the film 15, to provide means for readily placing said film in the proper position to start the exposure. A slot 36 is formed in the rear wall of the housing, and a registering slot 37 in the forward wall thereof, through which the printed items 16 of the film 15 may be successively exposed and projected on the screen. Each time the ratchet wheel 23 is stepped forward a notch, a new item 16 of printed matter is presented between the slots 36, 37 for projection on the screen.

I have shown the descriptive film 15 also provided with contact points for the intermittent operation of other devices (not shown) in a manner similar to that in which the descriptive film is operated from the picture film. The contact points are here shown as arranged in three concentric rows 38, 39, 40 on the film 15, and each row is adapted to pass between and complete the circuit through spaced contact brushes 41 mounted in the housing 14 and in open circuit with the supplementary devices to be operated, such as a graphophone, the signal lights to an orchestra, or other devices which might be desired for intermittent electrical control and in this manner synchronized with the travel of the descriptive film.

In Fig. 12 I have shown a diagrammatic representation of the electrical connections through one set of contact brushes 41, through conductors 50, to a supplementary device such as a phonograph or graphophone represented conventionally at 51, the circuit through said conductors being closed by the members of a set of contact points such as 39 in the descriptive film 15, which passes between said contact brushes, thus intermittently supplying electrical energy for starting or stopping the device 51 in any desired and well known manner.

The door 17 is provided with a spring latch 42 for yielding engagement with the margin of the housing 14.

I claim as my invention—

1. In a moving picture machine having a picture film, means controlled by the travel of said picture film for intermittently closing an electric circuit, and a supplementary descriptive film bearing radially arranged items of descriptive matter, a housing for said descriptive film, a shaft mounted for rotation in said housing, means for securing said descriptive film to said shaft, a ratchet wheel fixed to said shaft, a lever pivoted on said housing, a pawl pivoted on said lever and adapted to engage said ratchet wheel, a solenoid coil on said housing and adapted to receive impulses by the closing of said circuit, and a vertically arranged armature in said coil adapted to operate said lever.

2. In a moving picture machine having a picture film, means controlled by the travel of said picture film for intermittently closing an electric circuit, and a supplementary film bearing radially arranged items of descriptive matter, a housing for said descriptive film, a shaft mounted for rotation in said housing, means for removably and replaceably securing said descriptive film to said shaft, a ratchet wheel fixed to said shaft, a lever pivoted on said housing, a pawl pivoted on said lever and adapted to engage said ratchet wheel, a solenoid coil on said housing and adapted to receive impulses by the closing of said circuit, and a vertically arranged armature in said coil adapted to operate said lever.

3. In a moving picture machine having a picture film, means controlled by the travel of said picture film for intermittently closing an electric circuit, and a supplementary film bearing radially arranged items of descriptive matter, a housing for said descriptive film, a shaft mounted for rotation in said housing, means for securing said descriptive film to said shaft, a ratchet wheel fixed to said shaft, a lever pivoted on said housing, a pawl pivoted on said lever and adapted to engage said ratchet wheel, a solenoid coil on said housing and adapted to receive impulses by the closing of said circuit, a vertically arranged armature in said coil adapted to operate said lever, and a keeper embracing the free end of said lever.

4. In a moving picture machine having a picture film, means controlled by the travel of said picture film for intermittently closing an electric circuit, and a supplementary film bearing radially arranged items of descriptive matter, a housing for said descriptive film, a shaft mounted for rotation in said housing, means for securing said descriptive film to said shaft, a ratchet wheel fixed to said shaft, a lever pivoted on said housing, a pawl pivoted on said lever and adapted to engage said ratchet wheel, a solenoid coil on said housing adapted to receive impulses by the closing of said circuit, a vertically arranged armature in said coil adapted to operate said lever, and a holding detent pivoted on said housing and yieldingly engaging said ratchet wheel.

5. In a moving picture machine having a picture film, means controlled by the travel of said picture film for intermittently closing an electric circuit, and a supplementary film bearing radially arranged items of descriptive matter, a housing for said latter film, a shaft mounted for rotation in said housing, means for securing said descriptive film to said shaft, a ratchet wheel fixed to said shaft, a lever pivoted on said shaft and extending laterally therefrom, a pawl pivoted on said lever and adapted to engage said ratchet wheel, a solenoid coil on said housing adapted to receive impulses by the closing of said circuit, a vertically arranged armature in said coil adapted to oscillate said lever, and means to limit the downward movement of said armature.

6. In a moving picture machine having a picture film and a descriptive film and means actuated by the travel of the picture film for intermittently traveling said descriptive film, and in combination with other supplementary devices to be operated synchronously with said films, spaced contact devices in open circuit with said other supplementary devices, and contact points on said descriptive film for closing the circuit through said contact devices.

Signed by me at Union, Iowa, this 29 day of September, 1915.

JOHN W. BILLINGS.

Witnesses:
Le Roy F. Spurlin,
C. E. Barnes.